United States Patent
Hidaka et al.

(10) Patent No.: US 6,933,330 B2
(45) Date of Patent: Aug. 23, 2005

(54) WATER-BASED INK

(75) Inventors: Yuki Hidaka, Wakayama (JP); Takehiro Tsutsumi, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/749,388

(22) Filed: Dec. 28, 2000

(65) Prior Publication Data

US 2001/0023265 A1 Sep. 20, 2001

(30) Foreign Application Priority Data

Dec. 28, 1999 (JP) ............................................. 11-374969

(51) Int. Cl.$^7$ .......................... C09D 11/10; C08L 51/00
(52) U.S. Cl. ...................................... 523/160; 524/504
(58) Field of Search ................................ 523/160, 161; 106/31.27, 31.28, 31.6; 524/423, 504; 525/242, 216, 222, 309, 240, 218

(56) References Cited

U.S. PATENT DOCUMENTS

| | | | |
|---|---|---|---|
| 3,954,705 A | | 5/1976 | Ashe |
| 4,059,554 A | | 11/1977 | Pacansky |
| 4,255,308 A | | 3/1981 | Brasen |
| 4,840,865 A | | 6/1989 | Kato et al. |
| 5,026,755 A | | 6/1991 | Kveglis et al. |
| 5,231,131 A | * | 7/1993 | Chu et al. ................... 524/504 |
| 5,266,106 A | | 11/1993 | Winnik et al. |
| 5,310,778 A | | 5/1994 | Shor et al. |
| 5,336,725 A | * | 8/1994 | Tone et al. ................. 525/254 |
| 5,589,522 A | | 12/1996 | Beach et al. |
| 5,629,365 A | * | 5/1997 | Razavi ......................... 524/37 |
| 5,708,095 A | | 1/1998 | Grezzo Page et al. |
| 5,714,538 A | | 2/1998 | Beach et al. |
| 5,719,204 A | | 2/1998 | Beach et al. |
| 5,772,741 A | | 6/1998 | Spinelli |
| 5,814,685 A | * | 9/1998 | Satake et al. ................ 523/201 |
| 5,847,028 A | | 12/1998 | Iwase et al. |
| 5,969,033 A | | 10/1999 | Pearlstine |
| 5,977,207 A | * | 11/1999 | Yui et al. ..................... 523/160 |
| 6,005,023 A | | 12/1999 | Anton et al. |
| 6,020,400 A | | 2/2000 | Anton et al. |
| 6,057,384 A | * | 5/2000 | Nguyen et al. .............. 523/160 |
| 6,087,416 A | | 7/2000 | Pearlstine et al. |
| 6,117,921 A | | 9/2000 | Ma et al. |

FOREIGN PATENT DOCUMENTS

| | | |
|---|---|---|
| EP | 0879858 A2 | 11/1998 |
| JP | 4-233981 A | 8/1992 |
| JP | 6100810 | 4/1994 |
| JP | 6157954 | 6/1994 |
| JP | 8231912 | 9/1996 |
| JP | 1046069 | 2/1998 |
| JP | 10-46079 A | 2/1998 |
| JP | 10060360 | 3/1998 |
| JP | 1087754 | 4/1998 |
| JP | 1087768 | 4/1998 |
| JP | 10195354 | 7/1998 |
| JP | 10195355 | 7/1998 |
| JP | 10-251569 A | 9/1998 |
| JP | 10-251575 A | 9/1998 |
| JP | 11-246808 A | 9/1999 |
| JP | 11349871 | 12/1999 |
| JP | 2000044858 | 2/2000 |

* cited by examiner

*Primary Examiner*—Callie Shosho
(74) *Attorney, Agent, or Firm*—Birch, Stewart, Kolasch & Birch, LLP

(57) ABSTRACT

A water-based ink comprising (A) a coloring material; and (B) an aqueous dispersion of polymer particles comprising a water-insoluble graft copolymer having an acrylic polymer side chain (P) and a salt-forming group (Q), wherein the acrylic polymer side chain (P) is a polymer made of at least one monomer represented by the formula (1):

$$CH_2=C(R^1)COOR^2 \qquad (1)$$

wherein $R^1$ is hydrogen atom or an alkyl group having 1 to 5 carbon atoms; and $R^2$ is an alkyl group having 1 to 20 carbon atoms. The water-based ink is used for a water-based ink for inkjet printing.

15 Claims, No Drawings

WATER-BASED INK

BACKGROUND OF THE INVENTION

1. Field of the Invention

The present invention relates to a water-based ink, and more particularly to a water-based ink which can be suitably used for a water-based ink for inkjet recording.

2. Discussion of the Related Art

Recently, pigment dispersions have been used as colorants in order to meet the demands of light fastness and water resistance for water-based inks.

Polymeric dispersing agents, surfactants and the like have been used in a pigment dispersion used for writing utensils and usual inks. However, when this pigment dispersion is used for a water-based ink, water resistance and light fastness of the printed matter are not satisfactory. Also, when the pigment dispersion is used for a water-based ink for inkjet recording, storage stability and discharging property of ink droplets are not satisfactory.

In order to eliminate the above defects, there have been proposed an ink comprising an AB-type block polymer (Japanese Patent Laid-Open No. Hei 4-227668); an ink comprising an AB-type graft copolymer having a hydrophilic segment and a hydrophobic segment, the main chain of which is different from the side chain thereof (Japanese Patent Laid-Open No. Hei 10-87768); and the like.

Inkjet printing system is a printing system comprising directly jetting ink droplets from very fine nozzles, and depositing the ink droplets on a recording medium, to give characters and images. This system is advantageous in that not only the used device shows a low level of noise and has excellent operability, but also the coloration is facilitated and plain paper can be used as a recording medium. Especially, full color printing technique is advantageous in that vivid printed images having high chroma can be obtained when using a dye having ample color toning as compared to other printing systems.

Especially in the recent years, with the widespread of digital cameras, printed images having a high printed density, which are sharp like a photograph have been required.

In addition, various proposals have been made in order to improve weather resistance such as light fastness and water resistance of an ink. The dye is attractive in that it has vivid colors and its kinds are abundant. However, there are some defects in the dye such that discoloration or fading is caused in accordance with the passage of time, and that water resistance is low as to a water-soluble dye. On the other hand, there are some pigments which are excellent in light fastness, such as inorganic pigments such as carbon black, and metal-containing organic pigments such as copper phthalocyanine pigments. However, there is a defect in many of organic pigments such that discoloration or fading is caused in accordance with the passage of time.

In addition, color printed images are formed by a plurality of inks in general. If even one of the color inks is poor in weather resistance, the hue of printed images changes in accordance with the passage of time, so that the quality of its printed images is deteriorated. In view of the above, even more excellent weather resistance has been demanded for inks used for color printed images.

In order to improve weather resistance of the ink, there has been proposed to add an ultraviolet ray absorbent, a photostabilizer, an antioxidant, an ozone-deterioration preventive, or the like to the ink. However, since many of those components are oil-soluble, they cannot be used for an aqueous ink in an amount sufficient for imparting weather resistance.

As a means for improving weather resistance of an aqueous ink, there has been proposed a process comprising adding to an aqueous dispersion, polymer particles containing an ultraviolet ray absorbent or a photostabilizer, or polymer particles prepared by incorporating an ultraviolet ray absorbent or a photostabilizer to a polymer skeleton by copolymerization (Japanese Patent Laid-Open No. Hei 11-12519). However, there arise some defects in this process that scorching on the printer head of the inkjet printer is caused, and that clogging in the internal of its nozzles is likely to be caused.

An object of the present invention is to provide a water-based ink which gives clear printed characters, especially has a high printed density and no crookedness of a printed matter, and also has excellent weather resistance.

Another object of the present invention is to provide a water-based ink for inkjet recording which would not cause scorching on the printer head of the inkjet printer and clogging in the internal of the nozzle of the inkjet printer.

These and other objects of the present invention will be apparent from the following description.

SUMMARY OF THE INVENTION

According to the present invention, there is provided a water-based ink comprising:
(A) a coloring material; and
(B) an aqueous dispersion of polymer particles comprising a water-insoluble graft copolymer having an acrylic polymer side chain (P) and a salt-forming group (Q), wherein the acrylic polymer side chain (P) is a polymer made of at least one monomer represented by the formula (1):

$$CH_2=C(R^1)COOR^2 \qquad (1)$$

wherein $R^1$ is hydrogen atom or an alkyl group having 1 to 5 carbon atoms; and $R^2$ is an alkyl group having 1 to 20 carbon atoms.

DETAILED DESCRIPTION OF THE INVENTION

The coloring material (A) comprises a colorant as an essential component. The coloring material may contain water. Alternatively, the coloring material may not contain water.

The colorant includes dyes and pigments. The colorant can be used alone or in admixture of at least two kinds.

The dyes can be any of water-soluble dyes and hydrophobic dyes. Among the colorants, the hydrophobic dyes and the pigments are preferable from the viewpoint of water resistance. The pigments are more preferable from the viewpoint of weather resistance.

When the hydrophobic dye and/or the pigment are used as the colorant, the coloring material (A) can be any of an aqueous dispersion of polymer particles containing the hydrophobic dye and/or the pigment; an aqueous dispersion prepared by dispersing the hydrophobic dye and/or the pigment in water using a dispersing agent; and an aqueous dispersion of a pigment having a self-dispersibility.

The water-soluble dyes include direct dyes, acidic dyes, basic dyes, reactive dyes, food pigments, and the like.

The direct dye includes C. I. Direct Black 2, 4, 9, 11, 14, 17, 19, 22, 27, 32, 36, 38, 41, 48, 49, 51, 56, 62, 71, 74, 75, 77, 78, 80, 105, 106, 107, 108, 112, 113, 117, 132, 146, 154, 194; C. I. Direct Yellow 1, 2, 4, 8, 11, 12, 24, 26, 27, 28, 33, 34, 39, 41, 42, 44, 48, 50, 51, 58, 72, 85, 86, 87, 88, 98, 100, 110, 132; C. I. Direct Orange 6, 8, 10, 26, 29, 39, 41, 49, 51, 102; C. I. Direct Red 1, 2, 4, 8, 9, 11, 13, 17, 20, 23, 24, 28, 31, 33, 37, 39, 44, 46, 47, 48, 51, 59, 62, 63, 73, 75, 77, 80, 81, 83, 84, 85, 90, 94, 99, 101, 108, 110, 145, 189, 197, 220, 224, 225, 226, 227, 230; C. I. Direct Violet 1, 7, 9, 12, 35, 48, 51, 90, 94; C. I. Direct Blue 1, 2, 6, 8, 15, 22, 25, 34, 69, 70, 71, 72, 75, 76, 78, 80, 81, 82, 83, 86, 90, 98, 106, 108, 110, 120, 123, 158, 163, 165, 192, 193, 194, 195, 196, 199, 200, 201, 202, 203, 207, 218, 236, 237, 239, 246, 258; C. I. Direct Green 1, 6, 8, 28, 33, 37, 63, 64; C. I. Direct Brown 1A, 2, 6, 25, 27, 44, 58, 95, 100, 101, 106, 112, 173, 194, 195, 209, 210, 211, and the like.

The acidic dye includes C. I. Acid Black 1, 2, 7, 16, 17, 24, 26, 28, 31, 41, 48, 52, 58, 60, 63, 94, 107, 109, 112, 118, 119, 121, 122, 131, 155, 156; C. I. Acid Yellow 1, 3, 4, 7, 11, 12, 13, 14, 17, 18, 19, 23, 25, 29, 34, 36, 38, 40, 41, 42, 44, 49, 53, 55, 59, 61, 71, 72, 76, 78, 99, 111, 114, 116, 122, 135, 161, 172; C. I. Acid Orange 7, 8, 10, 33, 56, 64; C. I. Acid Red 1, 4, 6, 8, 13, 14, 15, 18, 19, 21, 26, 27, 30, 32, 34, 37, 40, 42, 45, 51, 52, 54, 57, 80, 82, 83, 85, 87, 88, 89, 92, 94, 97, 106, 108, 110, 111, 119, 129, 131, 133, 134, 135, 154, 155, 172, 176, 180, 184, 186, 187, 243, 249, 254, 256, 260, 289, 317, 318; C. I. Acid Violet 7, 11, 15, 34, 35, 41, 43, 49, 75; C. I. Acid Blue 1, 7, 9, 22, 23, 25, 27, 29, 40, 41, 43, 45, 49, 51, 53, 55, 56, 59, 62, 78, 80, 81, 83, 90, 92, 93, 102, 104, 111, 113, 117, 120, 124, 126, 145, 167, 171, 175, 183, 229, 234, 236; C. I. Acid Green 3, 9, 12, 16, 19, 20, 25, 27, 41; C. I. Acid Brown 4, 14, and the like.

The basic dye includes C. I. Basic Black 2, 8; C. I. Basic Yellow 1, 2, 11, 12, 14, 21, 32, 36; C. I. Basic Orange 2, 15, 21, 22; C. I. Basic Red 1, 2, 9, 12, 13, 37; C. I. Basic Violet 1, 3, 7, 10, 14; C. I. Basic Blue 1, 3, 5, 7, 9, 24, 25, 26, 28, 29; C. I. Basic Green 1, 4; C. I. Basic Brown 1, 12, and the like.

The reactive dye includes C. I. Reactive Black 1, 3, 5, 6, 8, 12, 14; C. I. Reactive Yellow 1, 2, 3, 13, 14, 15, 17; C. I. Reactive Orange 2, 5, 7, 16, 20, 24; C. I. Reactive Red 6, 7, 11, 12, 15, 17, 21, 23, 24, 35, 36, 42, 63, 66, 180; C. I. Reactive Violet 2, 4, 5, 8, 9; C. I. Reactive Blue 2, 5, 7, 12, 13, 14, 15, 17, 18, 19, 20, 21, 25, 27, 28, 37, 38, 40, 41, 71; C. I. Reactive Green 5, 7; C. I. Reactive Brown 1, 7, 16, and the like.

The food pigment includes C. I. Food Black 2; C. I. Food Yellow 3, 4, 5; C. I. Food Red 2, 3, 7, 9, 14, 52, 87, 92, 94, 102, 104, 105, 106; C. I. Food Violet 2; C. I. Food Blue 1, 2; C. I. Food Green 2, 3, and the like.

The hydrophobic dye includes oil dyes, disperse dyes, and the like. The oil dyes and the disperse dyes can be preferably used for any of an aqueous dispersion of polymer particles prepared by containing them in polymer particles and an aqueous dispersion prepared by dispersing the polymer particles in water by using a dispersing agent.

The oil dye includes C. I. Solvent Black Series; C. I. Solvent Yellow Series; C. I. Solvent Red Series; C. I. Solvent Violet Series; C. I. Solvent Blue Series; C. I. Solvent Green Series; C. I. Solvent Orange Series; and the like.

The disperse dye includes C. I. Disperse Yellow Series; C. I. Disperse Orange Series, C. I. Disperse Red Series; C. I. Disperse Violet Series; C. I. Disperse Blue Series; C. I. Disperse Green Series; and the like.

The pigment may be any kinds of known inorganic pigments or organic pigments. Those pigments can be used together with an extender, as occasion demands.

The inorganic pigment includes carbon black, metal oxides, metal sulfides, metal chlorides, and the like. Among them, carbon black is preferable for a black water-based ink. The carbon black includes furnace black, thermal lamp black, acetylene black, channel black, and the like.

The organic pigment includes azo pigments, diazo pigments, phthalocyanine pigments, quinacridone pigments, isoindolinone pigments, dioxazine pigments, perylene pigments, perinone pigments, thioindigo pigments, anthraquinone pigments, quinophthalone pigments, and the like. Among them, Pigment Yellow 17, 74, 110, 155, 180; Pigment Red 122; Pigment Blue 15:3, 15:4; and Pigment Black 7 are preferable from the viewpoints of toning and light fastness.

The extender includes silica, calcium carbonate, talc, and the like.

When the coloring material (A) contains water, it is desired that the content of the colorant in the coloring material (A) is 1 to 50% by weight, preferably 1 to 20% by weight, more preferably 1 to 10% by weight.

In addition, the coloring material (A) may contain a dispersing agent, an antiseptic, or the like, within a range which would not impair the effects exhibited by the present invention.

In the aqueous dispersion of polymer particles usable in the present invention, the polymer used in the polymer particles is a water-insoluble graft copolymer (B) having an acrylic polymer side chain (P) and a salt-forming group (Q).

The monomers constituting the acrylic polymer side chain (P) include (meth)acrylates such as methyl methacrylate, ethyl methacrylate, propyl methacrylate, n-butyl methacrylate, i-butyl methacrylate, 2-ethylhexyl methacrylate, octyl methacrylate, lauryl methacrylate, methyl acrylate, ethyl acrylate, n-butyl acrylate, i-butyl acrylate and 2-ethylhexyl acrylate. Those monomers can be used alone or in admixture of at least two kinds. Also, there can be used styrenic monomers such as styrene, vinyltoluene, 2-methylstyrene and chlorostyrene; acrylonitrile; vinyl acetate, and the like as a copolymerizable monomer.

In the present specification, "(meth)acrylic" is intended to mean methacrylic or acrylic.

When the pigment or the dye is selectively adsorbed to the acrylic polymer side chain (P), an excellent dispersion stability is imparted to the aqueous dispersion. When this dispersion stability is given, it is important to select an acrylic polymer side chain (P) which is appropriate for the kind of the pigment used. The acrylic polymer side chain (P) which is appropriate for the pigment can be determined, for instance, by measuring the adsorbed energy, or the like.

As a method for preparing the graft copolymer having an acrylic polymer side chain (P), there can be cited, for instance, a macromer method (A), a polymeric initiator method (B), and a polymer reaction method (C).

According to the macromer method (A), a graft copolymer is obtained by copolymerizing a (meth)acrylic macromer (a) having a polymerizable functional group at one end [hereinafter simply referred to as "(meth)acrylic macromer (a)"]; a polymerizable unsaturated monomer (b) having a salt-forming group [hereinafter simply referred to as "polymerizable unsaturated monomer (b)"]; and a monomer (c) copolymerizable with the (meth)acrylic macromer (a) and the polymerizable unsaturated monomer (b) [hereinafter simply referred to as "monomer (c)"].

The (meth)acrylic macromer (a) composes an acrylic polymer side chain (P), and the polymerizable unsaturated monomer (b) composes a salt-forming group.

According to the polymeric initiator method (B), a graft copolymer is obtained by the polymerization of a polymer (S) having an initiator structure showing a function as an initiator for polymerization or addition reaction [hereinafter simply referred to as "polymer (S)"], and a monomer (m) for initiating a polymerization or an addition reaction, or by the addition reaction of the monomer (m) to the polymer (S).

It is preferable that the polymer (S) is a polymer having an initiator structure prepared by converting to an initiator structure an initiator precursor structure of a polymer (T) having an initiator precursor structure which is convertible to an initiator structure by the reaction [hereinafter simply referred to as "polymer (T)"], and that the polymer (T) is a homopolymer of a monomer (n) having an initiator precursor structure [hereinafter simply referred to as "monomer (n)"], or a copolymer of the monomer (n) and a monomer (o) copolymerizable with the monomer (n) [hereinafter simply referred to as "monomer (o)"].

Concretely, there are, for instance, the following methods.

The first method includes a method for preparing a graft copolymer having an acrylic polymer side chain (P), comprising polymerizing a monomer having amino group, for instance, dimethylaminoethyl methacrylate to give a polymer having amino group, which is to be a main chain; diazotizing the polymer to introduce an azo initiator structure into the polymer; and polymerizing an acrylate monomer using this polymer as an initiator.

The second method includes a method for preparing a graft copolymer having an acrylic polymer side chain (P), comprising copolymerizing methacrylic acid chloride and a monomer copolymerizable with the methacrylic acid chloride, or copolymerizing an acid monomer and a monomer copolymerizable with the acid monomer, and thereafter converting its acid group to an acid chloride group with a chlorinating agent to give a polymer having an acid chloride group which is to be a main chain; treating the acid chloride group with an alcohol peroxide to convert the acid chloride group to a peroxide initiator group; and polymerizing the resulting polymer and an acrylate monomer. This method is suitable for the preparation of a graft copolymer, since the unreacted acid chloride groups are neutralized with an alkali. As the acid monomers, there can be used anionic monomers which can be used as the polymerizable unsaturated monomer (b) as explained below.

The third method includes a method comprising preparing a polymer which is to be a main chain having a chlorine atom; and carrying out the living polymerization of the polymer and a monomer in the presence of a catalyst such as cupric chloride so that the monomer is inserted between the chlorine-carbon. This method is advantageous in that the chain length of the side chain can be defined. The monomers include, for instance, methyl (meth)acrylate, butyl (meth) acrylate, hexyl (meth)acrylate, and the like.

The polymer reaction method (C) includes a method comprising reacting a reactive group (h) of the polymer which is to be a main chain with a reactive group (i) of a polymer which is to be a side chain. The reactive group (i) is positioned at the terminal of the polymer and reactive with the reactive group (h).

According to the polymer reaction method (C), a graft copolymer can be prepared, for instance, by copolymerizing at least one monomer selected from maleic anhydride, methacrylic acid chloride and a methacrylate having an isocyanate group, and other monomer to give a polymer having a reactive group, which is to be a main chain; and reacting this polymer with a polymer having a terminal reactive group which is reactive with the reactive group of the above polymer, which is to be a side chain. The polymer of which terminal reactive group is terminal amino group can be prepared by using 2-aminoethanthiol as a chain transfer agent.

It is desired that the molecular weight of the acrylic polymer side chain (P) is 300 to 20000, preferably 1000 to 10000, from the viewpoint of sufficiently improving the adsorptivity to a hydrophobic dye and/or a pigment and from the viewpoint of forming a stable aqueous dispersion, thereby improving its adsorptivity to the hydrophobic dye and/or the pigment. Among the acrylic polymer side chains (P), a polylauryl methacrylate side chain and a polyisobutyl methacrylate side chain are preferable, because they are effective in dispersion stability for Pigment Red 122, Pigment Yellow 74 and Pigment Blue 15:3.

It is preferable that the content of the acrylic polymer side chain (P) in the graft copolymer is 10 to 35% by weight, from the viewpoints of dispersion stability and discharging property.

It is preferable that the graft copolymer further has a nonionic polymer side chain (R), from the viewpoints of lowering the viscosity of the dispersion with giving excellent dispersion stability, further increasing the discharging stability of the water-based ink, and suppressing the generation of crookedness even when subjected to continuous printing.

The nonionic polymer side chain (R) includes a polyalkylene oxide chain and a polyamide chain, each of which has hydrogen atom or a monovalent hydrocarbon group having 1 to 10 carbon atoms which may have a heteroatom at one end.

The nonionic polymer side chain (R) preferably comprises a polymer made of at least one monomer represented by the formula (2):

$$CH_2=C(R^1)COO(R^3O)_nR^4 \quad (2)$$

wherein $R^1$ is as defined above, $R^3$ is a divalent hydrocarbon group having 1 to 30 carbon atoms, which may have a heteroatom, $R^4$ is hydrogen atom or a monovalent hydrocarbon group having 1 to 30 carbon atoms, which may have a heteroatom, and n is a number of 1 to 60; a polymer made of at least one monomer represented by the formula (3):

$$CH_2=C(R^1)CON(R^5)(R^6) \quad (3)$$

wherein $R^1$ is as defined above; and each of $R^5$ and $R^6$ is independently hydrogen atom or an alkyl group having 1 to 5 carbon atoms, or a copolymer made of at least one monomer represented by the formula (2) and at least one monomer represented by the formula (3); or is a group represented by the formula (4):

$$-(R^3O)_mR_4 \quad (4)$$

wherein $R^3$ and $R^4$ are as defined above; and m is a number of 3 to 60.

As a process for preparing a graft copolymer having a nonionic polymer side chain (R), there can be cited, for instance, a macromer method (1), a polymeric initiator method (2), and a polymer reaction method (3).

According to the macromer method (1), a graft copolymer is obtained by copolymerizing the (meth)acrylic macromer (a), the polymerizable unsaturated monomer (b), and the monomer (c) at least a part of which can form the nonionic polymer side chain (R). The descriptions for the (meth) acrylic macromer (a), the polymerizable unsaturated monomer (b) and the monomer (c) will be given below.

According to the polymeric initiator method (2), a graft copolymer is obtained by carrying out the polymerization or addition reaction of a monomer (m) using a polymer (S).

It is preferable that the polymer (S) is a polymer having an initiator structure prepared by converting to an initiator structure an initiator precursor structure of a polymer (T), and that the polymer (T) is a homopolymer made of a monomer (n) having an initiator precursor structure, or a copolymer of the monomer (n) and a monomer (o) copolymerizable with the monomer (n).

Concretely, there are, for instance, the following methods.

The first method includes a method for preparing a graft copolymer having a nonionic polymer side chain (R), comprising polymerizing a monomer having amino group, for instance, dimethylaminoethyl methacrylate to give a polymer having amino group which is to be a main chain; diazotizing the polymer to introduce an azo initiator structure into the polymer; and polymerizing polyethylene glycol (meth)acrylate using this polymer as an initiator.

The second method includes a method for preparing a graft copolymer having a polyethylene glycol methacrylate polymer side chain (P), comprising copolymerizing methacrylic acid chloride and a monomer copolymerizable with the methacrylic acid chloride, or copolymerizing an acid monomer and a monomer copolymerizable with the acid monomer, and thereafter converting its acid group to an acid chloride group with a chlorinating agent to give a polymer having acid chloride group, which is to be a main chain; treating the acid chloride group with an alcohol peroxide to convert the acid chloride group to a peroxide initiator group; and polymerizing the resulting polymer with polyethylene glycol (meth)acrylate. This method is suitable for the preparation of a graft copolymer, since the unreacted acid chloride groups are neutralized with an alkali. As the acid monomers, there can be used anionic monomers which can be used as the polymerizable unsaturated monomer (b) as explained below.

The third method includes a method comprising preparing a polymer which is to be a main chain having a chlorine atom; and carrying out the living polymerization of the polymer and a monomer in the presence of a catalyst such as cupric chloride, so that the monomer is inserted between the chlorine-carbon. This method is advantageous in that the chain length of the side chain can be defined. The monomer includes, for instance, polyethylene glycol (meth)acrylate, and the like.

The polymer reaction method (3) includes a method comprising reacting a reactive group (h) of the polymer which is to be a main chain with a reactive group (i) of a polymer to be a side chain. The reactive group (i) is positioned at the terminal of the polymer and reactive with the reactive group (h).

According to the polymer reaction method (3), a graft copolymer can be prepared, for instance, by copolymerizing at least one monomer selected from the group consisting of maleic anhydride, methacrylic acid chloride and a methacrylate having isocyanate group, and other monomer to give a polymer having a reactive group, which is to be a main chain; and reacting this polymer with a polymer having a terminal reactive group which is reactive and the reactive group of the above polymer, which is to be a side chain. The polymer of which terminal reactive group is terminal amino group can be prepared by using 2-aminoethanthiol as a chain transfer agent.

When the nonionic polymer side chain (R) comprises a polymer made of at least one monomer represented by the above-mentioned formula (2), a polymer made of at least one monomer represented by the formula (3), or a copolymer made of at least one monomer represented by the formula (2) and at least one monomer represented by the formula (3), terminal reactive macromonomers can be used. Concretely, the nonionic polymer side chain (R) can be prepared, for instance, by a process for preparing an oligomer having a terminal olefin group using a cobalt-based chain transfer agent (U.S. Pat. No. 5,362,826), a process comprising preparing a prepolymer having a terminal hydroxyl group, and thereafter forming a methacrylate macromer (Japanese Patent Laid-Open No. Sho 60-133007), or the like.

It is desired that the molecular weight of the nonionic polymer side chain (R) is 300 to 10000, preferably 500 to 2000, from the viewpoints of viscosity of the aqueous dispersion and storage stability.

It is preferable that the content of the nonionic polymer side chain (R) in the graft copolymer is 10 to 35% by weight, from the viewpoints of excellent dispersion stability and discharging property.

When the graft copolymer is prepared by the macromer method (1), the aqueous dispersion of polymer particles can be obtained by copolymerizing the (meth)acrylic macromer (a), the polymerizable unsaturated monomer (b), and the monomer (c) by means of, for instance, emulsion polymerization or the like. The aqueous dispersion of polymer particles can form micelles. Therefore, when the aqueous dispersion is mixed with the coloring material (A), there can be obtained a sharp printed image like a photograph, having little blotting and high printed density even when a plain paper is used. Furthermore, scorching on printer heads and clogging of the nozzles can also be suppressed.

The (meth)acrylic macromer (a) improves the stability of the aqueous dispersion of the polymer particles, even more than the silicone macromer and the styrene macromer described below, suppresses scorching on printer heads and clogging of nozzles during discharging, and gives excellent print images. The (meth)acrylic macromer (a) also improves the compatibility between the graft copolymer and at least one agent selected from the group consisting of ultraviolet ray absorbents, photostabilizers, antioxidants and ozone-deterioration preventives, thereby increasing the content of the polymer particles in the aqueous dispersion.

It is preferable that the number-average molecular weight of the (meth)acrylic macromer (a) is not less than 1000, from the viewpoint of stabilizing the aqueous dispersion of the polymer particles, and that the number-average molecular weight is not more than 10000, from the viewpoints of efficiently forming the aqueous dispersion of the polymer particles, and giving an excellent print image without causing scorching on the printer heads and clogging of the nozzles during discharging. From those viewpoints, it is preferable that the number-average molecular weight of the (meth)acrylic macromer (a) is 1000 to 10000.

The molecular weight of the (meth)acrylic macromer (a) can be determined, for instance, by gel permeation chromatography using polystyrene as a standard substance and 1 mmol/L dodecyldimethylamine-containing chloroform as a solvent.

The (meth)acrylic macromer (a) can be a homopolymer of a (meth)acrylate having a polymerizable functional group at one end, or a copolymer of the above (meth)acrylate and other monomer. Those can be used alone or in admixture of at least two kinds. Among the (meth)acrylic macromer (a), those having an acryloyloxy group or a methacryloyloxy group as a polymerizable functional group at one end are particularly preferable.

It is desired that the content of the (meth)acrylate in the copolymer of the (meth)acrylate and other monomer is not less than 60% by weight, preferably not less than 70% by weight, from the viewpoint of sufficiently securing the stability of the aqueous dispersion. The other monomer include styrene, acrylonitrile, vinyl acetate, and the like, but the present invention is not limited to those exemplified ones.

Concrete examples of the (meth)acrylic macromer (a) include a compound represented by the formula (I):

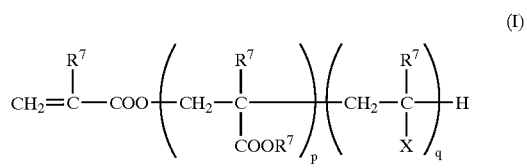

wherein each of $R^7$ is independently hydrogen atom or a hydrocarbon group having 1 to 12 carbon atoms; X is at least one group selected from the group consisting of —COOR$^7$ ($R^7$ is as defined above), an aromatic group having 6 to 12 carbon atoms, nitrile group and —OCOCH$_3$; each of p and q is an integer satisfying the relationship p/q (molar ratio) of 6/4 to 10/0 and a number-average molecular weight of 1000 to 10000.

Examples of the commercially available (meth)acrylic macromer (a) include methyl methacrylate macromer [e.g. TOAGOSEI CO., LTD., trade name: AA-6]; butyl acrylate macromer [e.g. TOAGOSEI CO., LTD., trade name: AB-6]; isobutyl acrylate macromer [e.g. TOAGOSEI CO., LTD., trade name: AW-6S]; lauryl methacrylate macromer [e.g. TOAGOSEI CO., LTD., trade name: MM-7LMA], and the like.

Among the (meth)acrylic macromer (a), an isobutyl methacrylate macromer represented by the formula (Ia):

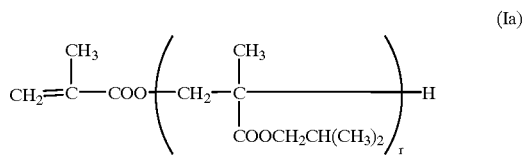

wherein r is an integer of 10 to 70 satisfying the number-average molecular weight of 6000, which is a compound represented by the formula (I) where the case q is zero, for instance, the trade name of AW-6S commercially available from TOAGOSEI CO., LTD. (number-average molecular weight: 6000) is preferable, from the viewpoint of stability of the aqueous dispersion.

The polymerizable unsaturated monomer (b) includes cationic monomers having a salt-forming group and anionic monomers having a salt-forming group.

Representative examples of the cationic monomers include unsaturated tertiary amine-containing monomers, unsaturated ammonium salt-containing monomers, and the like.

Concrete examples of the unsaturated tertiary amine-containing monomers include monovinylpyridines such as vinylpyridine, 2-methyl-5-vinylpyridine and 2-ethyl-5-vinylpyridine; styrenes having a dialkylamino group such as N,N-dimethylaminostyrene and N,N-dimethylaminomethylstyrene; (meth)acrylates having a dialkylamino group such as N,N-dimethylaminoethyl acrylate, N,N-dimethylaminoethyl methacrylate, N,N-diethylaminoethyl acrylate, N,N-diethylaminoethyl methacrylate, N,N-dimethylaminopropyl acrylate, N,N-dimethylaminopropyl methacrylate, N,N-diethylaminopropyl acrylate and N,N-diethylaminopropyl methacrylate; vinyl ethers having a dialkylamino group such as 2-dimethylaminoethyl vinyl ether; (meth)acrylamides having a dialkylamino group such as N-(N',N'-dimethylaminoethyl)acrylamide, N-(N',N'-dimethylaminoethyl)methacrylamide, N-(N',N'-diethylaminoethyl)acrylamide, N-(N',N'-diethylaminoethyl)methacrylamide, N-(N',N'-dimethylaminopropyl)acrylamide, N-(N',N'-dimethylaminopropyl)methacrylamide, N-(N',N'-diethylaminopropyl)acrylamide, and N-(N',N'-diethylaminopropyl)methacrylamide, and the like.

The unsaturated ammonium salt-containing monomers include compounds prepared by forming a quaternary group of those unsaturated tertiary amine-containing monomers with a quaternarizing agent such as an alkyl halide having an alkyl group of 1 to 18 carbon atoms and a halogen atom such as chlorine atom, bromine atom or iodine atom; a benzyl halide such as benzyl chloride or benzyl bromide; an alkyl ester having an alkyl group of 1 to 18 carbon atoms of methanesulfonic acid; an alkyl ester of an arylsulfonic acid such as benzenesulfonic acid or toluenesulfonic acid; and a dialkyl sulfate having an alkyl group of 1 to 4 carbon atoms.

Representative examples of the anionic monomer include unsaturated carboxylic acid monomers, unsaturated sulfonic acid monomers, unsaturated phosphate monomers, and the like.

Concrete examples of the anionic monomer include unsaturated carboxylic acid monomers such as acrylic acid, methacrylic acid, crotonic acid, itaconic acid, maleic acid, fumaric acid, citraconic acid, and 2-methacryloyloxymethyl succinic acid, anhydrides and salts thereof; unsaturated sulfonic monomers such as styrenesulfonic acid, 2-acrylamide-2-methylpropanesulfonic acid, 3-sulfopropyl (meth)acrylate, bis(3-sulfopropyl)-itaconate and salts thereof, and monosulfates of 2-hydroxyethyl (meth)acrylic acid; unsaturated phosphate monomers such as vinylphosphonic acid, vinyl phosphate, bis(methacroxyethyl) phosphate, diphenyl-2-acryloyloxyethyl phosphate, diphenyl-2-methacryloyloxyethyl phosphate, dibutyl-2-acryloyloxyethyl phosphate, dibutyl-2-methacryloyloxyethyl phosphate, and dioctyl-2-(meth)acryloyloxyethyl phosphate; and the like.

Among the polymerizable unsaturated monomer (b), acrylic acid, methacrylic acid, dimethylaminoethyl methacrylate and diethylaminoethyl methacrylate are preferable.

Concrete examples of the monomer (c) include acrylates such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, n-octyl acrylate, decyl acrylate and dodecyl acrylate; methacrylates such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, n-octyl methacrylate, decyl methacrylate and dodecyl methacrylate; styrenic monomers such as styrene, vinyltoluene, 2-methylstyrene and chlorostyrene; hydroxyl group-containing (meth)acrylates such as 2-hydroxyethyl acrylate, 3-hydroxypropyl acrylate, 2-hydroxyethyl methacrylate and 3-hydroxypropyl methacrylate; a monomer represented by the formula (II):

wherein $R^8$ is hydrogen atom or a lower alkyl group having 1 to 4 carbon atoms; $R^9$ is a divalent hydrocarbon group having 1 to 30 carbon atoms which may have a heteroatom; $R^{10}$ is hydrogen atom or a monovalent hydrocarbon group having 1 to 30 carbon atoms which may have a heteroatom; and s is a number of 1 to 60; a silicone macromer represented by the formula (III):

$$X(Y)_u Si(R^{11})_{3-t}(Z)_t \qquad (III)$$

wherein X is a polymerizable unsaturated group; Y is a divalent group; each of $R^{11}$ is independently hydrogen atom, a lower alkyl group having 1 to 5 carbon atoms, an aryl group having 6 to 12 carbon atoms or an alkoxy group having 1 to 6 carbon atoms; Z is a monovalent siloxane polymer residue having a number-average molecular weight of not less than 500; t is an integer of 1 to 3; and u is 0 or 1;

styrene macromers, and the like.

The monomer represented by the formula (II) is preferably used when introducing a nonionic side chain into the graft copolymer by the macromer method (A). The monomer represented by the formula (II) exhibits excellent effects of increasing injection stability of the water-based ink and suppressing the generation of crookedness when subjected to continuous printing.

Representative examples of the monomer represented by the formula (II) include polyethylene glycol (meth)acrylates having hydrogen atom at one end, methoxypolyethylene glycol (1–30: s value in the formula (II), hereinafter referred to the same) (meth)acrylates, methoxypolytetramethylene glycol (1–30) (meth)acrylates, ethoxypolyethylene glycol (1–30) (meth)acrylates, (iso)propoxypolyethylene glycol (1–30) (meth)acrylates, butoxypolyethylene glycol (1–30) (meth)acrylates, methoxypolypropylene glycol (1–30) (meth)acrylates, methoxy(ethylene glycol-propylene glycol copolymer) (1–30, out of which ethylene glycol: 1–29) (meth)acrylates, and the like. Those monomers can be used alone or in admixture of at least two kinds. Among them, methoxypolyethylene glycol (1–30) (meth)acrylates having hydrogen atom, methyl group or ethyl group at one end are preferable. In the present specification, the term "(iso) propoxy" means n-propoxy or isopropoxy.

Among the monomers represented by the formula (II), preferable ones are methoxy-terminated polyethylene glycol (4 mol) methacrylate [e.g. Shin-Nakamura Chemical Co., Ltd., trade name: NK ESTER M-40G]; methoxy-terminated polyethylene glycol (9 mol) methacrylate [e.g. Shin-Nakamura Chemical Co., Ltd., trade name: NK ESTER M-90G]; methoxy-terminated polyethylene glycol (2 mol) methacrylate [e.g. Shin-Nakamura Chemical Co., Ltd., trade name: NK ESTER M-230G]; methoxy-terminated polyethylene glycol (9 mol) acrylate [e.g. Shin-Nakamura Chemical Co., Ltd., trade name: NK ESTER AM-90G]; phenoxy-terminated polyethylene glycol (6 mol) acrylate [e.g. Shin-Nakamura Chemical Co., Ltd., trade name: NK ESTER AMP-60G]; hydroxyl group-terminated polyethylene glycol (5 mol) methacrylate [e.g. Nippon Nyukazai K.K., trade name: MA-50]; and hydroxyl group-terminated polyethylene glycol (10 mol) methacrylate [e.g. Nippon Nyukazai K.K., trade name: MA-100]. Among them, the methoxy-terminated polyethylene glycol methacrylate is more preferable, from the viewpoint that excellent dispersion stability can be obtained, and it is still more preferable that the length of the ethylene glycol chain is 4 to 9 mol.

In the silicone macromer represented by the formula (III), X is a polymerizable unsaturated group. Examples of X include methacryl group, acryl group, styryl group, and the like. Y is a divalent group. Examples of Y include a hydrocarbon group having 2 to 6 carbon atoms, and the like.

Among the silicone macromers, a silicone macromer represented by the formula (IV):

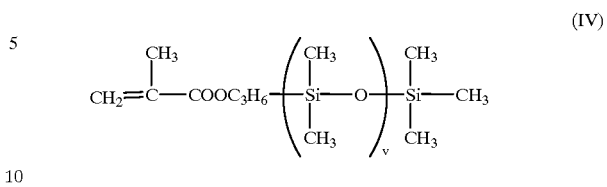

wherein v is a number satisfying the number-average molecular weight of 1000, for instance, trade name of FM-0711 commercially available from CHISSO CORPORATION, and the like are preferable.

The styrene macromers include styrene homopolymers having a polymerizable functional group at one end, or copolymers made of styrene having a polymerizable functional group at one end and other monomer. Among the styrene macromers, those having an acryloyloxy group or a methacryloyloxy group at one end as a polymerizable functional group are preferable. It is desired that the styrene content in the above copolymer made of a styrene having a polymerizable functional group at one end and other monomer is not less than 60% by weight, preferably not less than 70% by weight, from the viewpoint for sufficiently securing the stability of the aqueous dispersion. The other monomer includes acrylonitrile, and the like, without being limited thereto.

Concrete examples of the styrene macromer include a macromer represented by the formula (V):

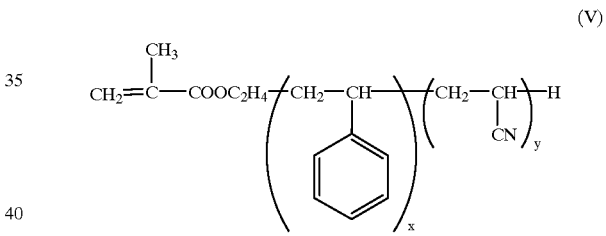

wherein each of x and y is an integer satisfying x/y (molar ratio) of 6/4 to 10/0, and a number-average molecular weight of 1000 to 10000, for instance, trade names of AS-6, AN-6 commercially available from TOAGOSEI CO., LTD., and the like.

It is preferable that the number-average molecular weight of the styrene macromer is not less than 1000, from the viewpoint of stabilizing the aqueous dispersion, and that the number-average molecular weight is not more than 10000, from the viewpoints of efficiently forming the aqueous dispersion of polymer particles, and giving excellent fixed images without causing scorching on the printer head and clogging of nozzles during discharging. From those viewpoints, it is preferable that the number-average molecular weight of the styrene macromer is 1000 to 10000.

It is preferable that the graft copolymer is a vinyl polymer obtained by copolymerizing an alkyl (meth)acrylate macromer as the (meth)acrylic macromer (a), (meth)acrylic acid as a polymerizable unsaturated monomer (b), and a polyethylene glycol (meth)acrylate as a monomer (c).

It is preferable that the content of the (meth)acrylic macromer (a) in the graft copolymer is 1 to 40% by weight. Also, it is preferable that the total content of the polymerizable unsaturated monomer (b) and the monomer (c) in the graft copolymer is 60 to 99% by weight.

In addition, during the preparation of the aqueous dispersion of the polymer particles, it is preferable to copolymerize a monomer (d) having a polymerizable group and a functional group showing at least one property selected from the group consisting of ultraviolet ray absorptivity, photostabilization, antioxidation and ozone-deterioration prevention [hereinafter simply referred to as "monomer (d)"] together with the (meth)acrylic macromer (a), the polymerizable unsaturated monomer (b) and the monomer (c).

The monomer (d) includes those having a benzophenone skeleton, a benzotriazole skeleton, a hindered phenol skeleton, a cyanoacrylate skeleton, a hindered amine skeleton, and the like. Concrete examples of the monomer (d) include a monomer having a benzophenone skeleton represented by the formula:

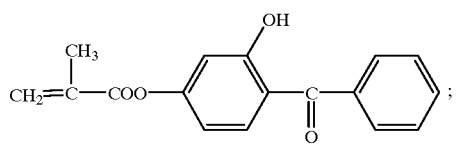

a monomer having a benzotriazole skeleton such as 2-(2'-hydroxy-5-methylacryloxyethylphenyl)-2H-benzotriazole [e.g. OTSUKA CHEMICAL CO., LTD., trade name: RUVA-93]; a monomer having a hindered phenol skeleton represented by the formula:

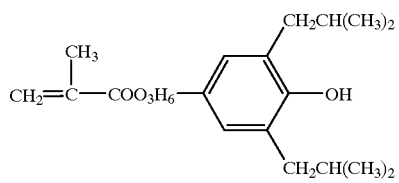

and the like; a monomer having a cyanoacrylate skeleton such as ethyl-2-cyano-3,3'-diphenyl acrylate and methyl-2-cyano-3-methyl-3-(p-methoxyphenyl) acrylate; a monomer having a hindered amine skeleton such as 1,2,2,6,6-pentamethyl-4-piperidyl methacrylate [e.g. ASAHI DENKA KOGYO K.K., trade name: ADEKA STAB LA-82], 2,2,6,6-tetramethyl-4-pipeidyl methacrylate [e.g. ASAHI DENKA KOGYO K.K., trade name: ADEKA STAB LA-87], 2-tert-butyl-6-(3-tert-butyl-2-hydroxy-5-methylbenzyl)-4-methylphenyl acrylate [e.g. Sumitomo Chemical Company, Limited, trade name: Sumilizer GM], 2-[1-(2-hydroxy-3,5-di-tert-pentylphenyl)ethyl]-4,6-di-tert-pentylphenyl acrylate [e.g. Sumitomo Chemical Company, Limited, trade name: Sumilizer GS], and the like.

It is preferable that the amount of the monomer (d) is preferably not less than 0.1 parts by weight, based on 100 parts by weight of the entire amount of the (meth)acrylic macromer (a), the polymerizable unsaturated monomer (b) and the monomer (c), from the viewpoint of giving excellent weatherability, and that the amount is preferably not more than 80 parts by weight, from the viewpoint of securing the stability of the aqueous dispersion of the polymer particles. From those viewpoints, the amount of the monomer (d) is preferably 0.1 to 80 parts by weight, more preferably 1 to 50 parts by weight, based on 100 parts by weight of the total amount of the (meth)acrylic macromer (a), the polymerizable unsaturated monomer (b) and the monomer (c).

The graft copolymer can be obtained by polymerizing the (meth)acrylic macromer (a), the polymerizable unsaturated monomer (b) and the monomer (c), and the monomer (d) as occasion demands by a polymerization method such as a bulk polymerization method, a solution polymerization, a suspension polymerization method, an emulsion polymerization method or a dispersion polymerization method in the presence of a radical polymerization initiator. Among those polymerization methods, the solution polymerization method is preferable.

The solvent used in the solution polymerization method is preferably a polar organic solvent. The polar organic solvent includes, for instance, aliphatic alcohols such as propanol; ketones such as acetone and methyl ethyl ketone; esters such as ethyl acetate, and the like. Among them, acetone and methyl ethyl ketone are preferable, because they function as a wetting agent of a polymer to the pigment when the polymer solution is directly used in the dispersion step, thereby reducing the load in the dispersion step.

The radical polymerization initiator includes, for instance, azo compounds such as 2,2'-azobisisobutyronitrile, 2,2'-azobis(2,4-dimethylvaleronitrile), 2,2'-azobis(4-methoxy-2,4-dimethylvaleronitrile), dimethyl-2,2'-azobisbutyrate, 2,2'-azobis(2-methylbutyronitrile), and 1,1'-azobis(1-cyclohexanecarbonitrile); peroxides such as tert-butyl peroxide, dicumyl peroxide, di-tert-butyl peroxide, dibenzoyl oxide, potassium persulfate and ammonium persulfate; and the like.

It is preferable that the amount of the radical polymerization initiator is 0.001 to 2.0% by mol, more preferably 0.01 to 1.0% by mol, to the total amount of the (meth)acrylic macromer (a), the polymerizable unsaturated monomer (b) and the monomer (c), and the monomer (d) as occasion demands.

During the polymerization, a polymerization chain transfer agent can be further added. The polymerization chain transfer agent includes, for instance, mercaptans such as octyl mercaptan, n-dodecyl mercaptan, tert-dodecyl mercaptan, n-hexadecyl mercaptan, n-tetradecyl mercaptan and tert-tetradecyl mercaptan; xanthogenndisulfides such as dimethyl xanthogenndisulfide, diethyl xanthogenndisulfide and diisopropyl xanthogenndisulfide; thiuram disulfides such as tetramethyl thiuram disulfide, tetraethyl thiuram disulfide and tetrabutyl thiuram disulfide; halogenated hydrocarbons such as carbon tetrachloride and ethylene bromide; hydrocarbons such as pentaphenylethane; unsaturated cyclic hydrocarbon compounds such as acrolein, methacrolein, allyl alcohol, 2-ethylhexyl thioglycolate, terpinolene, α-terpinene, γ-terpinene, diterpene, α-methylstyrene dimer, preferably one in which the content of 2,4-diphenyl-4-methyl-1-pentene is not less than 50% by weight, 9,10-dihydroanthracene, 1,4-dihydronaphthalene, indene and 1,4-cyclohexadiene; unsaturated heterocyclic compounds such as xanthene and 2,5-dihydrofuran; and the like. Those can be used alone or in admixture of at least two kinds. It is preferable that the amount of the polymerization chain transfer agent is usually 0.01 to 10 parts by weight, based on 100 parts by weight of the initially charged monomers.

The amount of the radical polymerization initiator cannot be absolutely determined, because the conditions for polymerizing the (meth)acrylic macromer (a), the polymerizable unsaturated monomer (b), the monomer (c) and the monomer (d) differ depending upon the kinds of those components, the radical polymerization initiator and the solvent used. It is desired that the polymerization temperature is usually 30° to 100° C., preferably 50° to 80° C. Also, the polymerization time period is usually 1 to 10 hours or so. In addition, it is preferable that the polymerization atmosphere is an atmosphere of an inert gas such as nitrogen gas or argon gas.

After termination of the polymerization reaction, the copolymer can be isolated from the reaction solution (also referred to as a vinyl polymer solution or a copolymer solution) by a known method such as re-precipitation or distilling off of the solvent. The resulting graft copolymer can be purified by the removal of unreacted monomers and the like by the repeat of re-precipitation, membrane separation, chromatography, extraction, or the like.

It is preferable that the weight-average molecular weight of the graft copolymer (determined in accordance with the method described in the subsequent Examples given below) is 3000 to 200000, from the viewpoint of stability of the dispersion, preferably 3000 to 50000, more preferably 3000 to 20000, from the viewpoints of prevention of scorching onto the printer head, durability of ink after printing, and formability of the dispersion.

It is preferable that the glass transition temperature of the main chain of the graft copolymer is 30° to 120° C., from the viewpoint of giving excellent fixing ability of the printed matter, and that its molecular weight is 5000 to 200000, from the viewpoint of obtaining a stable dispersion.

The water-based ink may contain the coloring material (A) and the polymer particles of the graft copolymer separately. Alternatively, the water-based ink can be an aqueous dispersion of the polymer particles of the graft copolymer (B) containing the coloring material (A). Among them, the aqueous dispersion is preferable from the viewpoints of water resistance, rubbing resistance, high lighter-fastness, and discharging ability.

When the graft copolymer is prepared by an emulsion polymerization method or a dispersion polymerization method, the resulting graft copolymer solution can be used as an aqueous dispersion of the polymer particles as it is. In addition, when the graft copolymer is prepared by the solution polymerization method, an aqueous dispersion of the polymer particles can be obtained by emulsifying the graft copolymer solution by means of a phase inversion emulsion method or a forced emulsion method. In this case, the coloring material can be also obtained by mixing and emulsifying a colorant with a graft copolymer solution, and emulsifying the mixture.

The coloring material can be constructed by:
1) an aqueous solution prepared by dissolving a water-soluble dye in water; or
2) an aqueous dispersion prepared by dispersing a hydrophobic dye or a pigment in water with a vinyl polymer or an emulsifying agent.

As the phase inversion emulsion method or the forced emulsion method, there can be cited, for instance, a method comprising dissolving the graft copolymer in an organic solvent, adding a hydrophobic dye, a pigment, a surfactant and/or a neutralizing agent as occasion demands to ionize a salt-forming group of the polymer, thereafter adding water thereto, dispersing those components by subjecting it to a sonication treatment as occasion demands, and thereafter distilling off the organic solvent to phase-invert to a water-based system. As the dispersing devices used in the dispersion, there can be employed conventional dispersing devices. Examples of the dispersing devices include sonication treatment devices, microfluidizers, horizontal beads mills, triple roller mills, and the like. The preparation conditions such as the kinds and amounts of the organic solvent and additives used when preparing the coloring material (A) in a state of an aqueous dispersion, may be the same as those conditions for preparing an aqueous dispersion of the polymer particles containing at least one agent selected from the group consisting of ultraviolet ray absorbents, photostabilizers, antioxidants and ozone-deterioration preventives [hereinafter referred to as component (e)] as described below.

It is preferable that the component (e) is contained in the polymer particles obtained in the manner as described above in order to improve weather resistance.

As a process for preparing an aqueous dispersion of polymer particles containing the component (e), there can be cited, for instance, a process comprising dissolving the polymer solution and the component (e) in an organic solvent, adding a neutralizing agent to ionize, adding water thereto, subjecting to a dispersion treatment such as a sonication treatment or the like as occasion demands, and distilling off the organic solvent to phase-invert to a water-based system; a process comprising polymerizing the monomer (d) together with the (meth)acrylic macromer (a), the polymerizable unsaturated monomer (b) and the monomer (c) when copolymerizing the monomer (d) and the polymer, by a polymerization method such as a bulk polymerization method, a solution polymerization, a suspension polymerization method, an emulsion polymerization method or a dispersion polymerization method, in the presence of a radical polymerization initiator.

The component (e) can be used without being limited to specified ones, so long as the component (e) can be contained in the polymer particles (B). The component (e) includes, for instance, at least one agent selected from the group consisting of ultraviolet ray absorbents such as benzophenone-based ultraviolet ray absorbents, benzotriazole-based ultraviolet ray absorbents, salicylate-based ultraviolet ray absorbents, cyanoacrylate-based ultraviolet ray absorbents and nickel complex salt-based ultraviolet ray absorbents; photostabilizers such as hindered amine-based photostabilizers; antioxidants such as phenol-based antioxidants (including hindered phenol-based antioxidants), amine-based antioxidants, sulfur-based antioxidants, phosphorus-based antioxidants; and ozone-deterioration preventives such as quinoline-based ozone-deterioration preventives and phenylenediamine-based ozone-deterioration preventives.

The benzophenone-based ultraviolet ray absorbents include 2-hydroxy-4-n-octoxybenzophenone, 2-hydroxy-4-n-dodecyloxybenzophenone, [e.g. SEEBRO KASEI K.K., trade name: SEESORB 103], 2,4-dihydroxybenzophenone, 2-hydroxy-4-methoxybenzophenone, 2,2', 4,4'-tetrahydroxybenzophenone, and the like. Among them, 2-hydroxy-4-n-octoxybenzophenone and 2-hydroxy-4-n-dodecyloxybenzophenone are preferable, from the viewpoints of weather resistance and stability of the aqueous dispersion.

The benzotriazole-based ultraviolet ray absorbents include 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, 2-(2'-hydroxy-3'-tert-butyl-5'-methylphenyl)-5-chlorobenzotriazole, and the like. Among them, 2-(2'-hydroxy-5'-tert-octylphenyl) benzotriazole is preferable from the viewpoints of weather resistance and stability of the aqueous dispersion.

The salicylate-based ultraviolet ray absorbents include phenyl salicylate, p-tert-butylphenyl salicylate, p-octylphenyl salicylate, and the like.

The cyanoacrylate-based ultraviolet ray absorbents include ethyl-2-cyano-3,3'-diphenyl acrylate, methyl-2-cyano-3-methyl -3-(p-methoxyphenyl) acrylate, butyl-2-cyano-3-methyl-3-(p-methoxyphenyl) acrylate, and the like.

The nickel complex salt-based ultraviolet ray absorbents include nickel —bis(octylphenyl) sulfite, nickel (II) 2,2'-thiobis(4-tert-octylferrate)-n-butylamine, nickel (II) 2,2'-thiobis(4-tert-octylferrate)-2-ethylhexylamine, nickel (II) 2,2'-thiobis(4-tert-octylferrate)triethanolamine, and the like.

The hindered amine-based photostabilizers include 2,2,6,6-tetramethyl-4-piperidyl/tridecyl-1,2,3,4-butanetetracarboxylate [e.g. ASAHI DENKA KOGYO K.K., trade name: ADEKA STAB LA-67], 1,2,2,6,6-pentamethyl-4-piperidyl/tridecyl)-1,2,3,4-butanetetracarboxylate [e.g. ASAHI DENKA KOGYO K.K., trade name: ADEKA STAB LA-62]; those having 2,2,6,6-tetramethylpiperidine skeleton such as 2,2,6,6-tetramethylpyridin-1-oxyl (triacetone-amine-N-oxyl) and the like. Among them, 2,2,6,6-tetramethyl-4-piperidyl/tridecyl-1,2,3,4-butanetetracarboxylate and 1,2,2,6,6-pentamethyl-4-piperidyl/tridecyl)-1,2,3,4-butanetetracarboxylate are preferable, from the viewpoints of weather resistance and stability of the aqueous dispersion.

As the phenol-based antioxidants including hindered phenol-based antioxidants, there can be cited butylated hydroxyanisole, 2,6-di-tert-butyl-4-ethylphenol [e.g. Manuzen Petrochemical Company, Limited trade name: Swanox 316], stearyl-β-(3,5-di-tert-butyl-4-hydroxyphenyl) propionate, 2,2'-methylenebis(4-methyl-6-tert-butylphenol) [e.g. Maruzen Petrochemical Company, Limited trade name: Swanox 425], 2,2'-methylenebis(4-ethyl-6-tert-butylphenol), 4,4'-butylidenebis(3-methyl-6-tert-butylphenol), 3,9-bis [1,1-dimethyl-2-[β-(3-tert-butyl-4-hydroxy-5-methylphenyl)propionyloxy]ethyl]-2,4,8,10-tetraixaspiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tetrakis [methylene-3-(3', 5'-di-tert-butyl-4'-hydroxyphenyl) propionate]methane [e.g. Nippon Ciba-Geigy, trade name: Irganox 1010], and the like. Among them, 2,2'-methylenebis (4-ethyl-6-tert-butylphenol) and tetrakis [methylene-3-(3', 5'-di-tert-butyl-4'-hydroxyphenyl)propionate]methane are preferable, from the viewpoints of weather resistance and stability of the aqueous dispersion.

The amine-based antioxidants include phenyl-β-naphthylamine, α-naphthylamine, N,N'-di-sec-butyl-p-phenylenediamine, phenothiazine, N,N'-diphenyl-p-phenylenediamine, 2,6-di-tert-butyl-p-cresol, 2,6-di-tert-butylphenol, 2,4-dimethyl-6-tert-butylphenol, butylhydroxyanisole, 2,2'-methylenebis(4-methyl-6-tert-butylphenol), 4,4 '-butylidenebis(3-methyl-6-tert-butylphenol), 4,4'-thiobis(3-methyl-6-tert-butylphenol), tetrakis [methylene-3-(3,5-di-tert-butyl-4-dihydroxyphenyl) propionate]methane, 1,1,3-tris(2-methyl-4-hydroxy-5-tert-butylphenyl)butane, and the like.

The sulfur-based antioxidants include dilauryl 3,3'-thiodipropionate, distearyl thiodipropionate, laurylstearyl thiodipropionate, dimyristyl 3,3'-thiodipropionate, distearyl β,β'-thiodipropionate, 2-mercaptobenzoimidazole, dilauryl sulfide, and the like.

The phosphorus-based anfioxidants include triphenyl phosphite [e.g. Johoki Kagaku K.K., trade name: JP360], octadecyl phosphite, triisodecyl phosphite, trilauryl trithiophosphite, trinonylphenyl phosphite, and the like. Among them, triphenyl phosphite, octadecyl phosphite and trinonylphenyl phosphite are preferable, from the viewpoints of weather resistance and stability of the aqueous dispersion.

The quinoline-based ozone-deterioration preventives include 6-ethoxy-2,2,4-trimethyl-1,2-dihydroxyquinoline and the like.

The phenylenediamine-based ozone-deterioration preventives include N-phenyl-N'-isopropyl-p-phenylenediamine, and the like.

At least one of the component (e) may be contained in the polymer particles. Especially, when an ultraviolet ray absorbent or a photostabilizer is used together with an antioxidant or an ozone-deterioration preventive, there can be obtained excellent effects of preventing color fading and discoloration regardless of whether or not the graft copolymer particles are irradiated with light.

It is preferable that the aqueous dispersion of the polymer particles containing the component (e) is prepared by a phase-inversion emulsion method or a forced emulsion method. In this case, it is desired that the component (e) is dissolved in an organic solvent in the amount of not less than 2 g/liter, preferably 20 to 500 g/liter.

In addition, it is preferable that the content of the component (e) in the polymer particles is not less than 1% by weight, from the viewpoint of exhibiting excellent weather resistance, and that the content is not more than 90% by weight, from the viewpoint of securing stability of the aqueous dispersion with the passage of time. From those viewpoints, it is desired that the content of the component (e) is 1 to 90% by weight, preferably 10 to 80% by weight.

A process for preparing an aqueous dispersion of the polymer particles containing the component (e) employing a phase-inversion method or a forced emulsion method will be described in detail hereinbelow.

First, the component (e) is dissolved in an organic solvent. In this case, it is preferable that 5 to 50 parts by weight of the graft copolymer and 0.1 to 90 parts by weight of the component (e) are dissolved in an organic solvent, based on 100 parts by weight of the organic solvent, from the viewpoint of obtaining an aqueous dispersion having excellent stability.

The organic solvent is preferably a good solvent for the graft copolymer and the component (e). Concrete examples of the organic solvent include methanol, ethanol, n-propanol, isopropanol, acetone, methyl ethyl ketone, diethyl ketone, dipropyl ketone, methyl isopropyl ketone, diethyl ether, dibutyl ether, tetrahydrofuran, dioxane, benzene, toluene, dichloroethane, chloroform, and the like. Among them, acetone, methyl ethyl ketone, toluene and dichloroethane are preferable, from the viewpoint of solubility of the vinyl polymer. The organic solvents may be used alone or in admixture of at least two kinds.

The organic solvent may be used together with a high-boiling point hydrophilic organic solvent as occasion demands. The high-boiling point hydrophilic organic solvent includes phenoxyethanol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol diethyl ether, 3-methyl-3-butoxybutanol, and the like.

Next, a neutralizing agent is added to the organic solvent solution of the graft copolymer and the component (e) as occasion demands to ionize the salt-forming group of the graft copolymer. As the neutralizing agent, there can be used an acid or a base depending upon the kinds of the salt-forming group. The acid includes, for instance, inorganic acids such as hydrochloric acid and sulfuric acid; and organic acids such as acetic acid, propionic acid, lactic acid, succinic acid and glycolic acid. In addition, the base includes, for instance, tertiary amines such as trimethylamine and triethylamine, ammonia, sodium hydroxide, potassium hydroxide, and the like. The present invention is not limited to those exemplified ones. Although the neutralization degree is not limited to specified ones, it is desired that the solution is neutralized so that the liquid property of the resulting aqueous dispersion of the self-dispersible polymer particles is weakly acidic to neutral, preferably its pH becomes 4.5 to 9.

After the addition of the neutralization agent, water (e.g. ion-exchanged water) is added to the organic solvent solution, and the mixture is heated under reduced pressure to distill off the organic solvent together with a given amount of water, whereby an aqueous dispersion of the polymer particles having a given solid content is obtained. It is preferable that the amount of water is 100 to 300 parts by weight, based on 100 parts by weight of the organic solvent contained in the organic solvent solution after addition of the neutralizing agent. A known dispersing agent can be added to the organic solvent solution.

It is preferable that the particle diameter of the polymer particles in the aqueous dispersion, which is determined by particle size distribution analyzer Model N4 commercially available from Coulter Counter, is 0.01 to 0.50 μm, more preferably 0.02 to 0.15 μm. It is preferable that the particle diameter is not less than 0.01 μm, from the viewpoints of preventing clogging of the nozzles and efficiently obtaining an addition effect, and that the particle diameter is not more than 0.50 μm, from the viewpoint of securing the stability of the dispersion.

In the water-based ink of the present invention, it is preferable that each content of the polymer particles used for the solid ingredients of the coloring material (A) and the aqueous dispersion (B) is not less than 0.1% by weight, respectively, from the viewpoint of sufficiently obtaining an effect of forming clear images, and that the content of the polymer particles is not more than 30% by weight, preferably not more than 20% by weight, from the viewpoints obtaining excellent dispersion stability of the ink, causing no thickening of the liquid accompanied by ink evaporation at the tip end of the nozzle and no aggregation of the particles, and preventing clogging of nozzles of the printer head. Therefore, from those viewpoints, it is desirable that each content of the polymer particles used for the solid ingredients of the coloring material (A) and the aqueous dispersion (B) is 0.1 to 30% by weight, preferably 0.1 to 20% by weight, more preferably 0.1 to 10% by weight, respectively.

The solvent used in the solution polymerization method is preferably a polar organic solvent. The polar organic solvent includes, for instance, aliphatic alcohols such as propanol; ketones such as acetone and methyl ethyl ketone; esters such as ethyl acetate, and the like. Among them, acetone and methyl ethyl ketone are preferable, because they function as a wetting accelerating agent of a polymer to the pigment when the polymer solution is directly used in the dispersion step, thereby reducing the load in the dispersion step.

In addition, it is preferable that the content of the aqueous dispersion of the polymer particles containing the component (e) in the water-based ink is within the range of the content of the polymer particles used in the aqueous dispersion (B), from the viewpoint of imparting weather resistance in addition to the reasons mentioned above.

In the water-based ink of the present invention, it is preferable to further add various additives, for instance, a wetting agent such as a polyhydric alcohol, a dispersing agent, a defoaming agent, a mildewproof agent, a chelating agent, and the like.

The wetting agent includes, for instance, polyhydric alcohols or ethers thereof such as ethylene glycol, propylene glycol, diethylene glycol, triethylene glycol, polyethylene glycol, glycerol, diethylene glycol diethyl ether and diethylene glycol mono-n-butyl ether; and acetates; and nitrogen-containing compounds such as 2-pyrrolidone, N-methyl-2-pyrrolidone and 1,3-dimethylimidazolidinone. Those wetting agents can be used alone or in admixture of at least two kinds. The content of the wetting agent in the water-based ink is not limited to specified ones. It is desirable that the content of the wetting agent in the water-based ink is 0.1 to 50% by weight, preferably 0.1 to 30% by weight.

As the dispersing agent usable for the aqueous dispersion prepared by dispersing the hydrophobic dye and/or the pigment using the dispersing agent, there can be used anionic, nonionic, cationic, and amphoteric dispersing agents within a range which would not impair the stability of the aqueous dispersion of the polymer particles. Among the dispersing agents, an acetylene derivative is preferable, because a sufficient effect can be expected in its small amount.

The water-based ink of the present invention gives clear printed characters, and is excellent in weather resistance. Also, when the water-based ink of the present invention is used for inkjet recording, it is less likely to cause scorchiing of the printer heads or clogging in the nozzles.

EXAMPLES

The units "parts" and "%" as used in Examples and Comparative Examples are based upon weight unless noted otherwise.

[I] Preparation of Aqueous Dispersion of Polymer Particles Comprising Water-Insoluble Graft Copolymer Having Acrylic Polymer Side Chain (P) and Salt-Forming Group (Q)

Preparation Example 1

Copolymer Solutions 1 to 3

A reaction vessel equipped with a stirrer, a reflux condenser, a dropping funnel, a thermometer and a nitrogen inlet tube was charged with 20 parts of methyl ethyl ketone as a polymerization solvent, monomers and a polymerization chain transfer agent which are listed in the column of "initially charged monomers" of Table 1, and nitrogen gas substitution was sufficiently carried out.

On the other hand, after a dropping funnel was subjected to sufficient nitrogen gas substitution, the dropping funnel was charged with monomers and a polymerization chain transfer agent which are listed in the column of "dropping monomers" of Table 1, 60 parts of methyl ethyl ketone and 0.2 parts of 2,2'-azobis(2,4-dimethylvaleronitrile). The mixed solution inside the reaction vessel was heated to 65° C. with stirring under nitrogen atmosphere, and the mixed solution inside the dropping funnel was gradually added dropwise thereto over a period of 3 hours. After 2 hours passed from the termination of dropping, thereto was added a solution prepared by dissolving 0.1 parts of 2,2'-azobis(2, 4-dimethylvaleronitrile) in 5 parts of methyl ethyl ketone. The mixture was further aged at 65° C. for 2 hours and then at 70° C. for 2 hours, to give each of Copolymer Solutions 1 to 3.

A part of the resulting Copolymer Solutions 1 to 3 was isolated by drying it at 105° C. for 2 hours under reduced pressure to completely remove the solvent. The weight-average molecular weight was determined by gel permeation chromatography using polystyrene as a standard substance, and tetrahydrofuran as a solvent. As a result, each of the resulting copolymers had a weight-average molecular weight of about 10000.

TABLE 1

| Copolymer Solution | | |
|---|---|---|
| 1 | 2 | 3 |
| Initially Charged Monomers (Parts) | | |
| Styrene (8) | Methyl Methacrylate (8) | Styrene (7.5) |
| Methacrylic Acid (2) | Maleic Acid (1) | Methacrylic Acid (1) |
| n-Dodecylmercaptan (0.6) | Silicone Macromer*1 (0.5) | Isobutyl Methacrylate |
| | Isobutyl Methacrylate Macromer*2 (0.5) | Macromer*2 (0.5) |
| | n-Dodecylmercaptan (0.6) | 2-[1-(2-Hydroxy-3,5-di-tert-pentylphenyl)ethyl]-4,6-di-tert-pentylphenyl Acrylate (1) |
| | | Mercaptoethanol (0.5) |

TABLE 1-continued

| Copolymer Solution | | |
|---|---|---|
| 1 | 2 | 3 |
| Dropping Monomers (Parts) | | |
| Styrene (72) | Methyl Methacrylate (72) | Styrene (67.5) |
| Methacrylic Acid (18) | Maleic Acid (9) | Methacrylic Acid (9) |
| n-Dodecylmercaptan (2.4) | Silicone Macromer*1 (4.5) | Isobutyl Methacrylate |
| | Isobutyl Methacrylate Macromer*2 (4.5) | Macromer*2 (4.5) |
| | n-Dodecylmercaptan (2.4) | 2-[1-(2-Hydroxy-3,5-di-tert-pentylphenyl)ethyl]-4,6-di-tert-pentylphenyl Acrylate (9) |
| | | Mercaptoethanol (2) |

(Note)
*1Commercially available from Chisso Corporation under the trade name: FM-0711
*2Commercially available from TOAGOSEI CO., LTD., under the trade name: AW-6S Preparation Example 2

Aqueous Dispersions 1 to 7 of Polymer Particles Containing No Coloring Material

The additive listed in Table 2 and 1000 parts of acetone were added to each of Copolymer Solutions 1 to 3 obtained in Preparation Example 1 and completely dissolved. To the resulting solution was added 98 parts of a 30% aqueous solution of the neutralizing base listed in Table 2 with stirring to partly neutralize the salt-forming groups of the copolymer. Thereto was added 1500 parts of ion-exchanged water, and thereafter methyl ethyl ketone and acetone were completely removed under reduced pressure at 60° C. Further, the mixture was concentrated by removing a part of water, to give Aqueous Dispersions 1 to 6 of polymer particles, the concentration of the solid ingredients of which was 10%. However, Aqueous Dispersion 7 of a vinyl polymer could not be emulsified.

TABLE 2

| Aqueous Dispersion | 1 | 2 | 3 | 4 | 5 | 6 | 7 |
|---|---|---|---|---|---|---|---|
| Copolymer Solution (parts) | Copolymer Solution 1 (100) | Copolymer Solution 2 (100) | Copolymer Solution 2 (99) | Copolymer Solution 2 (50) | Copolymer Solution 3 (50) | Copolymer Solution 3 (50) | Copolymer Solution 3 (5) |
| Additive | None | None | JP360*1(1) | Irganox 1010*2 (50) | None | Swanox 425*3 (50) | SEESORB 103*4 (95) |
| Neutralizing Base | NaOH | NaOH | KOH | NaOH | Triethanol-amine | Ammonia | NaOH |
| Particle Diameter of Polymer Particles (μm) | 0.05 | 0.06 | 0.12 | 0.11 | 0.07 | 0.11 | 0.15 |

(Note)
*1Antioxidant (commercially available from Johoku Kagaku K.K., trade name)
*2Antioxidant (commercially available from Nippon Ciba Geigy, trade name)
*3Antioxidant (commercially available from Maruzen Petroleum Company, Limited, trade name)
*4Ultraviolet ray absorbent (commercially available from SEEBRO KASEI K.K., trade name)

Preparation Example 3

Coloring Material 1: Aqueous Dispersion of Dye-Containing Polymer Particles

To 100 parts (calculated as solid ingredients) of Copolymer Solution 2 obtained in Preparation Example 1 were added 100 parts of Solvent Red 49 (dye) and 1000 parts of acetone, and completely dissolved. To the resulting solution was added 98 parts of a 30% aqueous sodium hydroxide with stirring to partly neutralize the salt-forming groups of the copolymer. Thereto was added 1500 parts of ion-exchanged water, and thereafter methyl ethyl ketone and acetone were completely removed under reduced pressure at 60° C. Further, the mixture was concentrated by removing a part of water, to give Coloring Material 1, the concentration of the solid ingredients of which was 10%.

Preparation Example 4

Coloring Material 2: Aqueous Dispersion of Pigment-Containing Polymer Particles To 100 parts (calculated as solid ingredients) of Copolymer Solution 2 obtained in Preparation Example 1 were added 100 parts of Pigment Blue 16 (pigment) and 1000 parts of toluene. To the resulting mixture was added 98 parts of a 30% aqueous ammonia with stirring to partly neutralize the salt-forming groups of the copolymer. Thereto was added 1500 parts of ion-exchanged water, and the mixture was emulsified with a homogenizer. Thereafter, methyl ethyl ketone and toluene were completely removed under reduced pressure at 60° C. Further, the mixture was concentrated by removing a part of water, to give Coloring Material 2, the concentration of the solid ingredients of which was 10%.

Examples 1 to 4 and Comparative Examples 1 to 3

Raw materials for ink were mixed to give a composition shown in Table 3, and thereafter the composition was stirred for not less than 0.5 hours to dissolve the raw materials in water. Thereafter, the solution was pressure-filtered with a membrane filter having a pore size of 1.2 μm [commercially available from Millipore Corporation, trade name], to give a water-based ink.

Some characters were printed on a plain paper [commercially available from CANON INC., under the trade name: PB-paper] with the water-based ink, using an inkjet printer [commercially available from CANON INC., under the trade name: BJC-430J]. The resulting printed matter was used for evaluating physical properties of the water-based ink in accordance with the following methods. The results are shown in Table 3.

(1) Clarity of Printed Characters

The clarity of printed characters was evaluated by visually observing the printed matter with naked eyes. The evaluation criteria are as follows:

[Evaluation Criteria]
◎: Remarkably excellent
○: Excellent (little blotting)
×: Poor (obvious blotting)

(2) Light Fastness

The light fastness was evaluated by determining the printed density of a printed matter before and after the irradiation with a xenon lamp at 1000 kJ/m$^2$ by using a Macbeth densitometer (manufactured by Macbeth Process Measurements Co., Product Number: RD918), and measuring its density difference. The evaluation criteria are as follows:

[Evaluation Criteria]
◎: Remarkably excellent (no changes)
○: Excellent (little changes)
×: Poor (remarkable discoloration and fading)

(3) Printed States

The printed states (clogging of nozzles and scorching on printer heads) were evaluated by visually observing the printed matter with naked eyes. The evaluation criteria are as follows:

[Evaluation Criteria]
◎: Remarkably excellent (no clogging of nozzles or no scorching on printer heads)
○: Excellent (little clogging of nozzles or little scorching on printer heads)
Δ: Some blurring of characters (some clogging of nozzles)
×: Not printable (clogging of nozzles or scorching on printer heads)

TABLE 3

| Ex. Nos. and Comp. Ex. Nos. | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Composition (%) | | | | | | | |
| Coloring Material 1* | | | 8 | | | 8 | |
| Coloring Material 2* | 8 | | | 8 | | | |
| C.I. Direct Yellow 132* | | 4 | | | 4 | | 4 |
| Glycerol | 5 | 5 | 5 | 5 | 5 | 5 | 5 |
| Isopropyl Alcohol | 5 | 5 | 5 | 5 | 5 | 5 | 5 |
| Aqueous Dispersion 1* | | | | | 0.05 | 10 | |
| Aqueous Dispersion 2* | | | | | | | 5 |
| Aqueous Dispersion 3* | 5 | | | | | | |
| Aqueous Dispersion 4* | | 2 | | | | | |
| Aqueous Dispersion 5* | | | 1 | | | | |
| Aqueous Dispersion 6* | | | | 0.3 | | | |
| Water | 77 | 84 | 81 | 81.7 | 85.95 | 72 | 81 |
| Evaluation | | | | | | | |
| Clarity of Printed Characters | ◎ | ◎ | ◎ | ○-◎ | × | ◎ | ◎ |
| Light Fastness | ○ | ○-◎ | ○ | ◎ | × | × | × |
| Printed States | ◎ | ◎ | ◎ | ◎ | ◎ | × | ◎ |

(Note)
*Calculated as weight of solid ingredients.

It is clear from the results shown in Table 3 that each of the water-based inks obtained in each Example has clear printed characters, excellent light fastness and excellent printed states, as compared with the water-based inks obtained in each Comparative Example, and is free from scorching on printer heads or clogging of nozzles.

[II] Preparation of Aqueous Dispersion of Polymer Particles Comprising Water-Insoluble Graft Copolymer Having Acrylic Polymer Side Chain (P), Salt-Forming Group (Q) and Nonionic Polymer Side Chain (R)

Preparation Examples 3 to 8

A reaction vessel was charged with 5 parts of methyl ethyl ketone as a polymerization solvent, monomers and a polymerization chain transfer agent which are listed in the column of "initially charged monomers" of Table 4, and nitrogen gas substitution was sufficiently carried out.

On the other hand, a dropping funnel was charged with monomers and a polymerization chain transfer agent which are listed in the column of "dropping monomers" of Table 4, 10 parts of methyl ethyl ketone and 1 part of 2,2'-azobis(2,4-dimethylvaleronitrile), and nitrogen gas substitution was sufficiently carried out.

The mixed solution inside the reaction vessel was heated to 75° C. with stirring under nitrogen atmosphere, and the mixed solution inside the dropping funnel was gradually added dropwise thereto over a period of 3 hours. After 2 hours passed from the termination of dropping, thereto was added a solution prepared by adding 0.3 parts of 2,2'-azobis(2,4-dimethylvaleronitrile) to 5 parts of methyl ethyl ketone. The mixture was further aged at 75° C. for 2 hours and then at 80° C. for 2 hours, and cooled. Thereafter, methyl ethyl ketone was added, to give a copolymer solution having a concentration of 50%.

A part of the resulting copolymer solution was isolated by drying it at 105° C. for 2 hours under reduced pressure to completely remove the solvent. The weight-average molecular weight was determined by gel permeation chromatography using polystyrene as a standard substance, and chloroform containing dodecyldimethylamine of 1 mmol/L as a solvent. The results are shown in Table 4.

A neutralizing agent (30% aqueous solution) was added in an amount shown in Table 4 to 10 parts of the resulting copolymer solution, to neutralize a part of the resulting copolymers. Further, 5 parts of a pigment shown in Table 4 and 25 parts of ion-exchanged water were added thereto, and the mixture was kneaded with a triple roller mill.

Thirty parts of ion-exchanged water was added to the resulting kneaded mixture, and the mixture was stirred. Thereafter, the organic solvent was removed under reduced pressure at 60° C., and the mixture was concentrated by removing a part of water, to give an aqueous dispersion of the pigment-containing graft copolymer particles, the concentration of the solid ingredients of which was 20%.

In Table 4, each abbreviation means the following:

M-90G: Methoxy-terminated polyethylene glycol (9 mol) methacrylate [commercially available from Shin-Nakamura Chemical Co., Ltd., under the trade name: NK ESTER M-90G]

M-40G: Methoxy-terminated polyethylene glycol (4 mol) methacrylate [commercially available from Shin-Nakamura Chemical Co., Ltd., under tie trade name: NK ESTER M-40G]

AA-6: Methyl polymethacrylate macromer [commercially available from TOAGOSEI CO., LTD., trade name]

AB-6: Polybutyl acrylate macromer [commercially available from TOAGOSEI CO., LTD., trade name]

AW-6S: Polyisobutyl acrylate macromer [commercially available from TOAGOSEI CO., LTD., trade name]

MA-100: Hydroxyl group-terminated polyethylene glycol (10 mol) methacrylate macromer [commercially available from Nippon Nyukazai K.K., trade name]

MM-7LMA: Polylauryl methacrylate macromer [commercially available from TOAGOSEI CO., LTD., trade name]

TABLE 4

| Preparation Example | | |
|---|---|---|
| 3 | 4 | 5 |
| Initially Charged Monomers (Parts) | | |
| Methacrylic Acid (2) | Methacrylic Acid (3) | Acrylic Acid (2) |
| Styrene (5) | Styrene (3) | Styrene (10) |
| Lauryl Methacrylate (6) | n-Butyl Methacrylate (7) | Lauryl Methacrylate (1) |
| M-90G (3) | M-90G (3) | M-40G (5) |
| AW-6S (4) | MM-7LMA (5) | AB-6 (2) |
| Mercaptoethanol (0.2) | n-Dodecylmercaptan (0.5) | Mercaptoethanol (0.4) |
| Dropping Monomers (Parts) | | |
| Methacrylic Acid (8) | Methacrylic Acid (12) | Acrylic Acid (8) |
| Styrene (20) | Styrene (12) | Styrene (40) |
| Lauryl Methacrylate (24) | n-Butyl Methacrylate (28) | Lauryl Methacrylate (4) |
| M-90G (12) | M-90G (6) | M-40G (20) |
| AW-6S (16) | MM-7LMA (16) | AB-6 (8) |
| Mercaptoethanol (0.8) | n-Dodecylmercaptan (2.0) | Mercaptoethanol (1.6) |
| Weight-Average Molecular Weight | | |
| 17000 | 18000 | 11000 |
| Pigment | | |
| Pigment Yellow 74 | Pigment Red 122 | Pigment Black 7 |
| Neutralizing Agent | | |
| Sodium Hydroxide (0.77) | Sodium Hydroxide (1.16) | Sodium Hydroxide (1.08) |

TABLE 4-continued

Preparation Example

| 6 | 7 | 8 |
|---|---|---|
| Initially Charged Monomers (Parts) | | |
| Dimethylaminoethyl Methacrylate (5) | Methacrylic Acid (2) | Methacrylic Acid (2) |
| Styrene (3) | Styrene (5) | Styrene (5) |
| n-Butyl Methacrylate (7) | Lauryl Methacrylate (6) | Lauryl Methacrylate (6) |
| MA-100 (3) | Hydroxyethyl Methacrylate (3) | M-90G (3) |
| AA-6 (1) | AW-6S (4) | Isobutyl Methacrylate (4) |
| AB-6 (1) | Mercaptoethanol (0.2) | Mercaptoethanol (0.2) |
| Mercaptoethanol (0.2) | | |
| Dropping Monomers (Parts) | | |
| Dimethylaminoethyl Methacrylate (20) | Methacrylic Acid (8) | Methacrylic Acid (8) |
| Styrene (12) | Styrene (20) | Styrene (20) |
| n-Butyl Methacrylate (28) | Lauryl Methacrylate (24) | Lauryl Methacrylate (24) |
| MA-100 (12) | Hydroxyethyl Methacrylate (12) | M-90G (12) |
| AA-6 (4) | AW-6S (16) | Isobutyl Methacrylate (16) |
| AB-6 (4) | Mercaptoethanol (0.8) | Mercaptoethanol (0.8) |
| Mercaptoethanol (0.8) | | |
| Weight-Average Molecular Weight | | |
| 19000 | 25000 | 14000 |
| Pigment | | |
| Pigment Blue 15:3 | Pigment Yellow 74 | Pigment Yellow 74 |
| Neutralizing Agent | | |
| Gluconic Acid (6.63) | Sodium Hydroxide (0.77) | Sodium Hydroxide (0.77) |

Examples 5 to 9 and Comparative Example 4

Forty parts of each of aqueous dispersions of the pigment-containing graft copolymer particles obtained in Preparation Examples 3 to 8, 5 parts of glycerol, 10 parts of 2-pyrrolidone, 5 parts of polyethylene glycol (molecular weight 1000), 2 parts of isopropanol, 1 part of acetylene glycol-polyethylene oxide adduct [commercially available from Kawaken Fine Chemicals Co., Ltd., under the trade name: Acetylenol EH] and 37 parts by weight of ion-exchanged water were mixed, and the resulting liquid mixture was filtered with a needle-less syringe having a volume of 25 mL [commercially available from TERUMO CORPORATION] to which 0.5 μm filter [acetyl cellulose membrane, outer diameter: 2.5 cm, commercially available from Fuji Photo Film Co., Ltd. ] was attached, thereby removing coarse grains, to sequentially give water-based inks of Examples 5 to 9 and Comparative 4 corresponding to Preparation Examples 3 to 8, respectively.

As the physical properties for the water-based inks obtained in Examples 5 to 9 and Comparative Example 4, the clarity of the printed characters and the printed states were evaluated in the same manner as in Examples 1 to 4. As indices for the clarity of the printed characters, the printed density and the crookedness of the printed matter were evaluated by the following methods. The results are shown in Table 5.
(4) Printed Density Solid image printing was carried out on a commercially available copy paper using a bubble jet printer [commercially available from CANON INC., model number: BJC-430] on a plain paper commercially available from Xerox Corporation under the trade name of Xerox 4024, and the printed image was allowed to stand at 25° C. for 1 hour, and thereafter its printed density was determined by using a Macbeth densitometer (manufactured by Macbeth Process Measurements Co., Product Number: RD914), and evaluated by the following evaluation criteria:
[Evaluation Criteria]
◯: Printed density being not less than 1.1
Δ: Printed density being not less than 1.0 and less than 1.1
×: Printed density being less than 1.0
(5) Crookedness of Printed Matter Ruled line printing was carried out using the above-mentioned printer and plain paper used in the evaluation of Printed Density, and the crookedness was evaluated in accordance with the following evaluation criteria:
⊚: No crookedness is observed.
◯: Little crookedness is observed.
Δ: Slight crookedness is observed.
×: Marked crookedness is observed.

As the weather resistance, the water resistance was evaluated on the basis of the following method in addition to light fastness. The results are shown in Table 5.
(6) Water Resistance Solid image printing was carried out on a commercially available copy paper with the above-mentioned printer, and dried at 25° C. for 1 hour. The printed density of the specified printed portion of the obtained sample was determined, and thereafter the printed copy paper was immersed in stand-still water for 10 seconds, and the paper was lifted vertically therefrom. After air-drying the paper at 25° C. for 24 hours, the printed density of the same printing portion as that before immersion was measured, and the residual ratio was determined by the following equation:

$$[\text{Residual Ratio}] = \frac{[\text{Printed Density After Immersion}]}{[\text{Printed Density Before Immersion}]} \times 100 \ (\%)$$

The water resistance was evaluated on the basis of the following evaluation criteria:
[Evaluation Criteria]
⊚: Residual ratio being not less than 95%
○: Residual ratio being not less than 90% and less than 95%
Δ: Residual ratio being not less than 70% and less than 90%
×: Residual ratio being less than 70%

Also, as the physical properties of the printed matter, rubbing resistance and high light-fastness were evaluated in accordance with the following methods. The results are shown in Table 5.

(7) Rubbing Resistance

Solid image printing was carried out on a commercially available copy paper using the above-mentioned printer. After the copy paper was dried at 25° C. for 24 hours, the printed surface was strongly rubbed with a finger. The extent of rub-off of the printed image was evaluated by the following evaluation criteria:
[Evaluation Criteria]
○: Substantially no printed image being rubbed off, and its periphery not being stained
Δ: Some printed image being rubbed off, its periphery being slightly stained, and finger also being slightly stained
×: Printed image being considerably rubbed off, its periphery being considerably stained, and finger also being considerably stained (8) High Lighter-Fastness Text printing was carried out on a commercially available copy paper using the above-mentioned printer, and after passage of 6 hours at 25° C., the extent of staining of the printed sample when traced with a commercially available aqueous fluorescent marker was observed with naked eyes, and the evaluation was made on the basis of the following evaluation criteria:
[Evaluation Criteria]
⊚: No staining such as rubbed stains was observed even when traced with a fluorescent marker.
○: Some rubbed stains were generated when traced with a fluorescent marker, but at a level without practical problems.
×: Generation of rubbed stains were observed when traced with a fluorescent marker, which was intolerable.

TABLE 5

| | Ex. 5 | Ex. 6 | Ex. 7 | Ex. 8 | Ex. 9 | Comp. Ex. 4 |
|---|---|---|---|---|---|---|
| Clarity of Printed Characters | ⊚ | ⊚ | ⊚ | ⊚ | ⊚ | ○ |
| Printed States | ⊚ | ⊚ | ⊚ | ⊚ | ⊚ | ○ |
| Printed Density | ○ | ○ | ○ | ○ | × | × |
| Crookedness of Printed Matter | ○ | ○ | ○ | ○ | ○ | × |
| Water Resistance | ○ | ○ | ○ | ○ | Δ | ○ |
| Rubbing Resistance | ○ | ○ | ○ | ○ | Δ | ○ |
| High Lighter-Fastness | ○ | ○ | ○ | ○ | Δ | ○ |

It is clear from the results shown in Table 5 that each of the water-based inks obtained in each example gives a high printed density, generates no crookedness of the printed matter, and is excellent in water resistance, rubbing resistance and high lighter-fastness.

The water-based ink of the present invention forms printed characters which are clear and have high print densities, with no crookedness of the printed matter, and are excellent in rubbing resistance and high lighter-fastness, and have good weather resistance. Therefore, there are exhibited excellent effects that printed matters can be provided without causing scorching on the printer heads or clogging in the nozzle.

Equivalent

Those skilled in the art will recognize, or be able to ascertain using simple routine experimentation, many equivalents to the specific embodiments of the invention described in the present specification. Such equivalents are intended to be encompassed in the scope of the present invention as recited in the following claims.

What is claimed is:

1. A water-based ink comprising:

(A) a coloring material; and (B) an aqueous dispersion of polymer particles comprising a water-insoluble graft copolymer comprising an acrylic polymer side chain (P) and a salt-forming group (Q), wherein the acrylic polymer side chain (P) is a (co)polymer consisting essentially of:

at least one monomer represented by the following formula (1), $$CH_2=C(R^1)COOR^2 \qquad (1)$$

wherein $R^1$ is a hydrogen atom or an alkyl group having 1 to 5 carbon atoms, and $R^2$ is an alkyl group having 1 to 20 carbon atoms; and optionally at least one comonomer selected from styrene, acrylonitrile and vinyl acetate, and wherein the content of the monomer represented by the formula (1) in the (co)polymer is not less than 60% by weight wherein the graft copolymer has a nonionic polymer side chain (R) comprising:

(I) a polymer made of at least one monomer represented by the formula (2):

$$CH_2=C(R^1)COO(R^3O)_nR^4 \qquad (2)$$

wherein $R^1$ is as defined above; $R^3$ is a divalent hydrocarbon group having 1 to 30 carbon atoms, which may have a heteroatom; $R^4$ is a hydrogen atom or a monovalent hydrocarbon group having 1 to 30 carbon atoms, which may have a heteroatom; and n is a number of 1 to 60;

(II) a polymer made of at least one monomer represented by the formula (3):

$$CH_2=C(R^1)CON(R^5)(R^6) \qquad (3)$$

wherein $R^1$ is as defined above; and each of $R^5$ and $R^6$ is independently a hydrogen atom or an alkyl group having 1 to 5 carbon atoms;

(III) a copolymer made of at least one monomer represented by the formula (2) and at least one monomer represented by the formula (3); or (IV) a group represented by the formula (4):

$$-(R^3O)_m R^4 \qquad (4)$$

wherein $R^3$ and $R^4$ are as defined above; and m is a number of 3 to 60 wherein the content of said nonionic polymer side chain (R) is 10 to 35% by weight of said graft copolymer.

2. The water-based ink according to claim 1, wherein the graft copolymer is a polymer prepared by the polymerization of a polymer (S) having an initiator structure showing a function as an initiator for polymerization or addition reaction with a monomer (m) for initiating a polymerization or an addition reaction by the polymer (S), or by the addition reaction of the monomer (m) to the polymer (S).

3. The water-based ink according to claim 2, wherein the polymer (S) is a polymer having an initiator structure prepared by converting to an initiator structure an initiator precursor structure of a polymer (T) having an initiator precursor structure which is convertible to an initiator structure, and the polymer (T) is a homopolymer made of a monomer (n) having an initiator precursor structure, or a copolymer of the monomer (n) with a monomer (o) copolymerizable with the monomer (n).

4. The water-based ink according to claim 1, wherein the graft copolymer is a polymer prepared by reacting a reactive group (h) of apolymer which forms a main chain with a reactive group (i) of a polymer which forms a side chain, said reactive group (i) being positioned at the terminal of the polymer and having a reactivity with the reactive group (h).

5. The water-based ink according to claim 1, wherein the polymer particles comprise at least one agent selected from the group consisting of ultraviolet ray absorbents, photostabilizers, antioxidants and ozone-deterioration preventives.

6. The water-based ink according to claim 1, wherein the graft copolymer has a functional group showing at least one property selected from the group consisting of ultraviolet ray absorptivity, photostabilization, antioxidation and ozone-deterioration prevention.

7. The water-based ink according to claim 1, wherein the content of the colorant of said coloring material (A) is 1 to 50% by weight of said coloring material (A).

8. The water-based ink according to claim 1, wherein said acrylic polymer side chain (P) is a polylauryl methacrylate side chain or a polyisobutyl methacrylate side chain.

9. The water-based ink according to claim 1, wherein the content of said acrylic polymer side chain (P) is 10 to 35% by weight of said graft copolymer.

10. The water-based ink according to claim 1, wherein the aqueous dispersion is an aqueous dispersion of polymer particles of the graft copolymer containing the coloring material.

11. The water-based ink according to claim 1, wherein said acrylic polymer side chain (P) is a polymer made from one or more monomers selected from the group consisting of methyl methacrylate, ethyl methacrylate, propyl methacrylate, n-butyl methacrylate, i-butyl methacrylate, 2-ethyihexyl methacrylate, octyl methacrylate, lauryl rnethacrylate, methyl acrylate, ethyl acrylate, n-butyl acrylate, i-butyl acrylate, and 2-ethyihexyl acrylate.

12. A water-based ink comprising:

(A) a coloring material; and (B) an aqueous dispersion of polymer particles comprising a water-insoluble graft copolymer comprising an acrylic polymer side chain (P) and a salt-forming group (Q), wherein the acrylic polymer side chain (P) is a (co) polymer consisting essentially of:

at least one monomer represented by the following formula (1), $$CH_2=C(R^1)COOR^2 \qquad (1)$$

wherein $R^1$ is a hydrogen atom or an alkyl group having 1 to 5 carbon atoms, and $R^2$ is an alkyl group having 1 to 20 carbon atoms; and optionally at least one comonomer selected from styrene, acrylonitrile and vinyl acetate, and wherein the content of the monomer represented by the formula (1) in the (co)polymer is not less than 60% by weight wherein the graft copolymer has a nonionic polymer side chain (R) comprising:

(I) a polymer made of at least one monomer represented by the formula (2):

$$CH_2=C(R^1)COO(R^3O)_n R^4 \qquad (2)$$

wherein $R^1$ is as defined above; $R^3$ is a divalent hydrocarbon group having 1 to 30 carbon atoms, which may have a heteroatom; $R^4$ is a hydrogen atom or a monovalent hydrocarbon group having 1 to 30 carbon atoms, which may have a heteroatom; and n is a number of 1 to 60;

(II) a polymer made of at least one monomer represented by the formula (3):

$$CH_2=C(R^1)CON(R^5)(R^6) \qquad (3)$$

wherein $R^1$ is as defined above; and each of $R^5$ and $R^6$ is independently a hydrogen atom or an alkyl group having 1 to 5 carbon atoms;

(III) a copolymer made of at least one monomer represented by the formula (2) and at least one monomer represented by the formula (3); or (IV) a group represented by the formula (4):

$$-(R^3O)_m R^4 \qquad (4)$$

wherein $R^3$ and $R^4$ are as defined above; and m is a number of 3 to 60 wherein the content of said nonionic polymer side chain (R) is 10 to 35% by weight of said graft copolymer wherein the graft copolymer is a vinyl polymer obtained by copolymerizing (i) a (meth)acrylic macromer (a) having a polymerizable functional group at one end;

(ii) a polymerizable unsaturated monomer (b) having a salt-forming group; and (iii) a monomer (c) copolymerizable with the (meth) acrylic macromer (a) and the polymerizable unsaturated monomer (b).

13. The water-based ink according to claim 12, wherein at least a part of the monomer (c) is a monomer represented by the formula (2):

  (2)

wherein $R^1$ is a hydrogen atom or an alkyl group having 1 to 5 carbon atoms; $R^3$ is a divalent hydrocarbon group having 1 to 30 carbon atoms, which may have a heteroatom; $R^4$ is hydrogen atom or a monovalent hydrocarbon group having 1 to 30 carbon atoms, which may have a heteroatom; and n is a number of 1 to 60.

14. The water-based ink according to claim 12, wherein the number-average molecular weight of said (meth)acrylate macromer (a) is from 1,000 to 10,000.

15. The water-based ink according to claim 12, wherein said (meth)acrylate macromer (a) is a compound represented by formula (I):

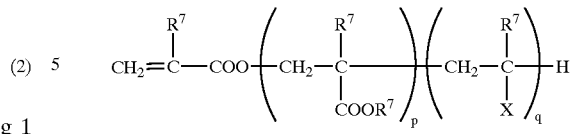  (I)

wherein each of $R^7$ is independently a hydrogen atom or a hydrocarbon group having 1 to 12 carbon atoms; X is at least one group selected from the group consisting of $-COOR^7$ ($R^7$ is defined as above), an aromatic group having 6 to 12 carbon atoms, nitrile group and $-OCOCH_3$; and each of p and q is an integer satisfying the relationship p/q (molar ratio) of 6/4 to 10/0 and a number-average molecular weight of 1000 to 10,000.

* * * * *